United States Patent [19]

Lawrence

[11] 4,042,642
[45] Aug. 16, 1977

[54] UREA ADDITIVES FOR SULFUR VULCANIZABLE POLYMERS

[75] Inventor: John P. Lawrence, Stow, Ohio

[73] Assignee: The Goodyear Tire & Rubber Company, Akron, Ohio

[21] Appl. No.: 652,438

[22] Filed: Jan. 26, 1976

Related U.S. Application Data

[62] Division of Ser. No. 266,040, June 26, 1972, Pat. No. 3,960,857.

[51] Int. Cl.$^2$ .................. C08C 11/60; C08D 9/00
[52] U.S. Cl. .................. 260/780; 260/79.5 B; 260/784
[58] Field of Search .................. 260/79.5 B, 79.5 A, 260/780, 784

[56] References Cited

U.S. PATENT DOCUMENTS

| | | | |
|---|---|---|---|
| 3,427,319 | 2/1969 | Coran | 260/309.2 |
| 3,473,667 | 10/1969 | Coran | 260/309.7 |
| 3,838,114 | 9/1974 | Lawrence | 260/79.5 A |

*Primary Examiner*—Christopher A. Henderson, Jr.
*Attorney, Agent, or Firm*—F. W. Brunner; J. A. Rozmajzl

[57] ABSTRACT

Ureas such as 1,3-bis(morpholinothio)-imidazolidinone are used to affect the vulcanization characteristics of sulfur vulcanizable polymers by increasing the state of vulcanization and improving scorch resistance and/or increasing the rate of vulcanization.

9 Claims, No Drawings

UREA ADDITIVES FOR SULFUR VULCANIZABLE POLYMERS

This is a division of application Ser. No. 266,040 filed June 26, 1972 which issued June 1, 1976 as U.S. Pat. No. 3,960,857.

BACKGROUND OF THE INVENTION

This invention relates to compounds which function to increase the state (degree) of vulcanization when used during the sulfur vulcanization of rubbers by donating sulfur to the system. This invention also relates to compounds which provide a vulcanizable polymer with balanced processing and vulcanization characteristics. In addition, it relates to compounds which retard vulcanization during the processing of vulcanizable rubbery compositions. It also relates to compounds which function as activators, that is, secondary accelerators in sulfur type vulcanization systems. It also relates to processes for increasing the state of vulcanization of sulfur vulcanizable rubbery compositions and either increasing scorch delay periods and/or increasing vulcanization rates. It also relates to the vulcanized products resulting therefrom.

The physical properties of a vulcanized composition are related to its state of vulcanization. Often, as the state of vulcanization is increased, certain physical properties are improved. Rubber additives such as sulfur donors can be used therefore to increase the state of vulcanization or to permit the use of lesser amounts of free sulfur.

Scorching during the processing of rubber is due to the premature or insipient vulcanization which can occur during any of the steps involved in the processing of the rubber prior to the final vulcanization step or during storage between said processing steps. Whereas a properly compounded unscorched rubber formulation can be die extruded or sheeted smoothly from a calender without lumping, a scorched material often becomes wavy or lumpy after sheeting and must be discarded. It is therefore desirable that rubber additives be used which reduce scorching. Such compounds are commonly referred to as retarders.

It is often desirable to increase the rate at which rubbery compositions are vulcanized. Sulfur vulcanizable rubbery compositions containing free sulfur are made to vulcanize more rapidly by the addition of an accelerator compound. Often the accelerator compound is referred to as a primary accelerator and is used in combination with another accelerator called an activator or secondary accelerator which further increases the vulcanization rate.

It is an object of this invention to provide sulfur donors which will increase the state of vulcanization of vulcanized rubbery polymers as well as compounds which are secondary accelerators (activators) and/or retarders (scorch inhibitors). Another object of the present invention is to provide processes which will improve the scorch resistance and rate of vulcanization of vulcanizable rubbery polymers and also the state of vulcanization of sulfur vulcanized rubbers.

SUMMARY OF THE INVENTION

The objects of the present invention are accomplished by a sulfur vulcanizable combination of a sulfur vulcanizable rubber and at least one compound having the following structural formula.

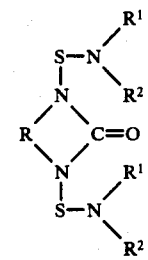

wherein R is a saturated or olefinic divalent aliphatic radical having 1 to 7 carbon atoms, such as an alkylene radical, or a saturated or olefinic divalent cyclic aliphatic radical such as a cycloalkylene, cycloalkenylene, or arylene radical, or the radical

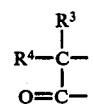

which together with the

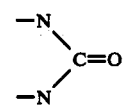

radical forms a hydantoin ring wherein $R^3$ and $R^4$ are selected from the group consisting of hydrogen, alkyl radicals having 1 to 4 carbon atoms, cycloalkyl radicals having 5 to 6 carbon atoms, aralkyl radicals having 7 to 10 carbon atoms and aryl radicals having 6 to 10 carbon atoms or $R^3$ and $R^4$ can be joined to form with the attached carbon atom a hydrocarbon ring containing 5 to 6 carbon atoms, and wherein $R^1$ and $R^2$ are selected from the group consisting of alkyl radicals having 1 to 20 carbon atoms, cyano alkyl radicals having 2 to 21 carbon atoms, cycloalkyl radicals having 5 to 20 carbon atoms, aralkyl radicals having 7 to 20 carbon atoms and aryl radicals (e.g., phenyl, p-tolyl, haloaryl, nitroaryl and alkoxyaryl) having 6 to 20 carbon atoms and wherein $R^1$ and $R^2$ can be joined through a member of the group consisting of —CH$_2$—, —O—, and —S— to constitute with the attached nitrogen atom a heterocyclic ring.

PREFERRED EMBODIMENTS

Preferably R is ethylene, 1-oxo-2,2-dimethylethylene, 4,5-cyclohexenylene, ortho-phenylene, or 1,3-propylene. Preferably

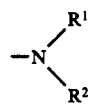

is morpholino, 2,6-dimethylmorpholino, piperidino, diethylamino, diisopropylamino, 3-methylpiperidino, dicyclohexylamino, β-cyanoethylcyclohexylamino, β-cyanoethyl-t-butylamino, β-cyanoethyl-n-butylamino, N-phenylcyclohexylamino, N-methylanilino, N-ethylanilino, N-ethylbenzylamino, dibenzylamino, N-phenylbenzylamino, cyanomethylcyclohexylamino, and cyanomethyl-n-butylamino.

Compounds which act as both retarders and activators in natural rubber and SBR include those according to structural formula I wherein R is ethylene, o-phenylene or 1-oxo-2,3-dimethylethylene and

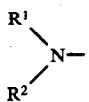

is morpholino. Where R is one of the three radicals described above and

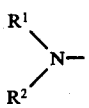

is piperidino, the compounds are retarders.

The following compounds illustrate, but do not limit, the sulfonamides of the present invention.

1,3-Bis(morpholinothio)-2-imidazolidinone
1,3-Bis(2,6-dimethylmorpholinothio)-2-imidazolidinone
1,3-Bis(piperidinothio)-2-imidazolidinone
1,3-Bis(2-methylpiperidinothio)-2-imidazolidinone
1,3-Bis(3-methylpiperidinothio)-2-imidazolidinone
1,3-Bis(4-methylpiperidinothio)-2-imidazolidinone
1,3-Bis(pyrrolidinothio)-2-imidazolidinone
1,3-Bis(diethylaminothio)-2-imidazolidinone
1,3-Bis(di-n-propylaminothio)-2-imidazolidinone
1,3-Bis(di-isopropylaminothio)-2-imidazolidinone
1,3-Bis(di-n-butylaminothio)-2-imidazolidinone
1,3-Bis(di-isobutylaminothio)-2-imidazolidinone
1,3-Bis(di-n-hexylaminothio)-2-imidazolidinone
1,3-Bis(di-n-octylaminothio)-2-imidazolidinone
1,3-Bis(dicyclohexylaminothio)-2-imidazolidinone
1,3-Bis(N-methylcyclohexylaminothio)-2-imidazolidinone
1,3-Bis(dibenzylaminothio)-2-imidazolidinone
1,3-Bis(morpholinothio)-2-benzimidazolinone
1,3-Bis(piperidinothio)-2-benzimidazolinone
1,3-Bis(3-methylpiperidinothio)-2-benzimidazolinone
1,3-Bis(pyrrolidinothio)-2-benzimidazolinone
1,3-Bis(diethylaminothio)-2-benzimidazolinone
1,3-Bis(di-n-propylaminothio)-2-benzimidazolinone
1,3-Bis(diisopropylaminothio)-2-benzimidazolinone
1,3-Bis(di-n-butylaminothio)-2-benzimidazolinone
1,3-Bis(di-isobutylaminothio)-2-benzimidazolinone
1,3-Bis(di-n-octylaminothio)-2-benzimidazolinone
1,3-Bis(morpholinothio)-tetrahydro-2-pyrimidone
1,3-Bis(piperidinothio)-tetrahydro-2-pyrimidone
1,3-Bis(3-methylpiperidinothio)-tetrahydro-2-pyrimidone
1,3-Bis(pyrrolidinothio)-tetrahydro-2-pyrimidone
1,3-Bis(diethylaminothio)-tetrahydro-2-pyrimidone
1,3-Bis(di-n-propylaminothio)-tetrahydro-2-pyrimidone
1,3-Bis(diisopropylaminothio)-tetrahydro-2-pyrimidone
1,3-Bis(di-n-butylaminothio)-tetrahydro-2-pyrimidone
1,3-Bis(morpholinothio)-4-methyl-2-imidazolidinone
1,3-Bis(piperidinothio)-4-methyl-2-imidazolidinone
1,3-Bis(pyrrolidinothio)-4-methyl-2-imidazolidinone
1,3-Bis(diethylaminothio)-4-methyl-2-imidazolidinone
1,3-Bis(di-n-propylaminothio)-4-methyl-2-imidazolidinone
1,3-Bis(di-n-butylaminothio)-4-methyl-2-imidazolidinone
1,3-Bis(morpholinothio)-5,5-dimethylhydantoin
1,3-Bis(piperidinothio)-5,5-dimethylhydantoin
1,3-Bis(3-methylpiperidinothio)-5,5-dimethylhydantoin
1,3-Bis(pyrrolidinothio)-5,5-dimethylhydantoin
1,3-Bis(di-n-propylaminothio)-5,5-dimethylhydantoin
1,3-Bis(diisopropylaminothio)-5,5-dimethylhydantoin
1,3-Bis(diisobutylaminothio)-5,5-dimethylhydantoin
1-Methyl-3-(morpholinothio)-hydantoin
1-Methyl-3-(piperidinothio)-hydantoin
1-Methyl-3-(4-methylpiperidinothio)-hydantoin
1-Methyl-3-(pyrrolidinothio)-hydantoin
1-Methyl-3-(di-n-propylaminothio)-hydantoin
1-Methyl-3-(diisopropylaminothio)-hydantoin
1-Methyl-3-(diisobutylaminothio)-hydantoin
1,3-Bis(N-ethylbenzylaminothio)-2-imidazolidinone
1,3-Bis(N-phenylbenzylaminothio)-2-imidazolidinone
1,3-Bis(N-phenylcyclohexylaminothio)-2-imidazolidinone
1,3-Bis(N-β-cyanoethyl-tert-butylaminothio)-2-imidazolidinone
1,3-Bis(N-β-cyanoethylcyclohexylaminothio)-2-imidazolidinone
1,3-Bis(N-cyanomethyl-n-butylaminothio)-2-imidazolidinone
1,3-Bis(N-β-cyanoethyl-n-butylaminothio)-2-imidazolidinone
1,3-Bis(N-methylanilinothio)-2-imidazolidinone
1,3-Bis(N-cyanomethylcyclohexylaminothio)-2-imidazolidinone When used with a conventional primary accelerator and sulfur, the compounds of structural formula (I) provide a vulcanizable polymer with balanced processing and vulcanization characteristics. In many vulcanization systems they provide both improved scorch resistance and improved activation characteristics. In systems where they provide only improved scorch resistance or improved activation characteristics, they do so without adversely affecting the scorch resistance or conversely the activation characteristics. This is unique in that conventional retarders normally adversely affect vulcanization rates, much less improve the rate, while conventional activators normally adversely affect scorch, much less improve scorch resistance. Whether these compounds act as both activators and retarders, or just as an activator, or just as a retarder, is not only dependent upon the primary accelerator being used but also upon the particular polymer being vulcanized as well as the particular sulfur donor compound of the present invention being used. The effect of accelerator systems, polymeric environment and different sulfur donor compounds is illustrated herein. It should be noted, however, that regardless of the accelerator system used or the particular polymer vulcanized, the compounds almost always act as sulfur donors. In any case, the ureas of the present invention will act at least as one of the following; a sulfur donor, an activator or a retarder.

The ureas of the present invention can be prepared by reaction of an aminesulfenyl chloride with a urea in the presence of an organic acid acceptor such as pyridine or triethylamine. The aminesulfenyl chlorides, in turn, may be prepared using any of the available methods described in the literature, for example by chlorination of an N,N′-dithiobis(amine), [German Pat. No. 965,968 (1954)], or by reaction of a secondary amine with sulfur dichloride in the presence of an organic acid acceptor, [German Pat. No. 1,131,222 (1962)]. Generally a solution of the aminesulfenyl chloride in an inert solvent is added to a solution or suspension of the urea, also in an inert solvent.

The performance of the compounds of the present invention as retarders, activators or in increasing the state of vulcanization is not dependent upon their method of preparation.

The ureas of the present invention can be used with any conventional compounding additive such as carbon black, zinc oxide, antidegradants and stearic acid. They can be used in a sulfurless system with an accelerator (a sulfur donor or otherwise), preferably a primary accelerator, or with a sulfur vulcanization agent in the presence of an accelerator. For the purposes of this invention, sulfur vulcanizing agent means elemental sulfur (free sulfur) or sulfur donating vulcanizing agents, for example, an amine disulfide or a polymeric polysulfide. Preferably the ureas are used with both a sulfur vulcanization agent, preferably free sulfur, and an accelerator, preferably a primary accelerator. The invention is applicable to vulcanization accelerators of various classes using conventional accelerator levels. Regardless of what accelerator is used, the ureas will still normally act as sulfur donors. For example, rubber mixes containing the aromatic thiazole accelerators which include N-cyclohexyl-2-benzothiazolesulfenamide, 2-mercaptobenzothiazole, N-tert-butyl-2-benzothiazolesulfenamide, 2-benzothiazolyl diethyldithiocarbamate and 2-(morpholinothio)-benzothiazole can be used. Other thiazole accelerators which may be used include 2-(aminodithio)-thiazoles and 2-(aminotrithio)-thiazoles such as 2-(morpholinodithio)-benzothiazole. Amine salts of mercaptobenzothiazole accelerators, for example, the t-butylamine salt of mercaptobenzothiazole, and like salts of morpholine and 2,6-dimethylmorpholine can be used in the invention. Thiazole accelerators other than aromatic can be used. Stocks containing accelerators, for example, tetramethylthiuram disulfide, tetramethylthiuram monosulfide, aldehyde amine condensation products, thiocarbamylsulfenamides, thioureas, xanthates, and guanidine derivatives are substantially improved using the process of the present invention.

The ureas of the invention can be used in any sulfur vulcanizable rubber including natural and synthetic rubbers and mixtures thereof. Synthetic rubbers that can be improved by the process of this invention include homopolymers and copolymers of dienes, both conjugated and nonconjugated, e.g., 1,3-dienes such as 1,3-butadiene and isoprene. Examples of such synthetic rubbers include neoprene (polychloroprene), cis-1,4 polybutadiene, cis-1,4 polyisoprene, butyl rubber, copolymers of 1,3-butadiene or isoprene with monomers such as styrene, acrylonitrile and methyl methacrylate. Ethylene/propylene terpolymers, for example ethylene/propylene/dicyclopentadiene terpolymers also benefit from the practice of the present invention.

The ureas can be added to the rubbers by any conventional technique such as milling or Banburying.

All of the working examples herein are intended to illustrate but not limit the scope of the present invention. Unless indicated otherwise, all parts are parts by weight.

The following examples, 1 to 4, illustrate the preparation of various ureas of the present invention, and are not intended to limit the scope of the present invention.

EXAMPLE 1

To prepare 1,3-bis(morpholinothio)-imidazolidinone, 0.5 mole of chlorine gas was added during one-half hour to a mixture of 118.0 grams (0.50 mole) 4,4'-dithiobis(-morpholine) and 500 ml. of toluene at 0°–5° C. The resulting solution of morpholinesulfenyl chloride was added dropwise to a mixture of 43.0 grams (0.50 mole) 2-imidazolidinone, 120.0 grams (1.20 mole) triethylamine, and 500 ml. of tetrahydrofuran. After 1 hour, the mixture was poured into 5 liters of water, sufficient chloroform added to dissolve the insoluble solid, the lower layer drawn off, dried over anhydrous magnesium sulfate, and concentrated in vacuo. The residue was recrystallized from 2-propanol-benzene to afford 82.0 grams (51.3%) of product with a melting point of 198°–201° C. Analysis of the product showed 17.58 percent nitrogen and 19.9 percent sulfur. The percentages calculated for $C_{11}H_{20}N_4O_3S_2$ were 17.50 percent nitrogen and 20.0 percent sulfur.

EXAMPLE 2

To prepare 1,3-bis(piperidinothio)-2-imidazolidinone, 0.25 mole of chlorine gas was added during twenty minutes to a solution of 58.0 grams (0.25 mole) N,N'-dithiobis-(piperidine) in 150 ml. of carbon tetrachloride at 0°–5° C. The resulting solution of piperidinesulfenyl chloride was added dropwise to a mixture of 21.5 grams (0.25 mole) 2-imidazolidinone, 60.6 grams (0.60 mole) triethylamine, and 350 ml. of tetrahydrofuran. After 1 hour, the mixture was poured into 3 liters of water, extracted with chloroform, the combined extracts dried over anhydrous magnesium sulfate, and concentrated in vacuo. The residue was recrystallized twice from 2-propanol-benzene to afford 39.9 grams (50.5%) of the product with a melting point of 173°–174° C. Analysis showed 17.65 percent nitrogen and 20.2 percent sulfur. The percentages calculated for $C_{13}H_{24}N_4OS_2$ were 17.72 percent nitrogen and 20.2 percent sulfur.

EXAMPLE 3

To prepare 1,3-bis(morpholinothio)-2-benzimidazolinone, 0.185 mole of chlorine gas was added during 15 minutes to a solution of 43.7 grams (0.185 mole) N,N'-dithiobis(morpholine) in 100 ml. of ethylene dichloride at 0°–5° C. The resulting solution of morpholinesulfenyl chloride was added dropwise to a mixture of 24.8 grams (0.185 mole) 2-hydroxybenzimidazole, 44.8 grams (0.443 mole) triethylamine, and 500 ml. of ethylene dichloride during 22 minutes. After 20 minutes, the reaction mixture was filtered, the filtrate extracted with three, 500 milliliter portions of water, dried over anhydrous magnesium sulfate, and concentrated in vacuo. The residue was recrystallized from 2-propanol-benzene to afford 47.4 grams (69.7%) of the product with a melting point of 152°–154° C. Analysis showed 15.41 percent nitrogen and 17.59 percent sulfur. The percentages calculated for $C_{15}H_{20}N_4O_3S_2$ were 15.22 percent nitrogen and 17.39 percent sulfur.

EXAMPLE 3

To prepare 1,3-bis(morpholinothio)-5,5-dimethylhydantoin, 13.5 grams (0.10 mole) of sulfuryl chloride was added dropwise to a mixture of 23.6 grams (0.10 mole) of 4,4'-dithiobis(morpholine) and 100 ml. of benzene at room temperature. After stirring 20 minutes, the resulting solution of morpholinesulfenyl chloride was added dropwise during 20 minutes to a mixture of 12.8 grams (0.10 mole) of 5,5-dimethylhydantoin, 24.2 grams (0.24 mole) of triethylamine, and 250 ml. benzene. After 30 minutes, the reaction mixture was filtered, the filtrate extracted with three, 500 ml. portions of water, dried over anhydrous magnesium sulfate and concentrated in vacuo. The residue was recrystallized from methanol-benzene to afford 14.3 grams (39.5%) of the product with a melting point of 151°-153° C. Analysis showed 15.21 percent nitrogen and 17.68 percent sulfur. The percentages calculated for $C_{13}H_{22}N_4O_4S_2$ were 15.47 percent nitrogen and 17.68 percent sulfur.

The other compounds included within the practice of the present invention can be prepared by using the same or similar techniques as described in the preceding working examples. Synthetic routes to these compounds are not limited, however, to these particular reactions and procedures.

Tables I, II, III and IV illustrate the use of various ureas of the present invention with different rubber stocks. The compositions are intended only to be illustrative of the practice of the present invention and not limiting. Mooney Scorch tests were performed using the large rotor as described in ASTM D 1646-61. A recorder was employed to continuously plot viscosity versus time. The number of minutes ($t\Delta 5$) required for the viscosity curve to rise five points above the minimum was taken as a measure of scorch inhibition. Larger values for ($t\Delta 5$) indicate a greater resistance to scorch or premature vulcanization.

Data on vulcanizing characteristics were obtained with a Monsanto Oscillating Disc Rheometer, as described by Decker, Wise, and Guerry in *Rubber World*, page 68, December 1962. Pertinent data from this instrument are: $t_4$, the minutes required for the Rheometer torque curve to rise four units above the minimum torque value, and $t_{90}$, the minutes required for the torque curve to reach 90 percent of the difference between the maximum and minimum torque values.

The $t_{90}$ value is considered to be the time required to reach the optimum vulcanized state. The difference, ($t_{90} - t_4$) is indicative of the time necessary for actual vulcanization to take place after the scorch delay period has ended, i.e., is a relative measure of vulcanization rate. Compounds which increase $t_4$, but do not greatly increase ($t_{90} - t_4$) are preferred since these impart processing safety, yet do not require greatly extended vulcanization times.

$\Delta$Rh is the difference between the maximum and minimum torque obtained on the rheometer curve. It is used as a measure of the degree (state) of vulcanization.

The following Examples 5 to 12 illustrate the use of the sulfur donors of the present invention in both natural rubber and SBR (butadiene/styrene elastomer). Stock A was used in Examples 5 to 8 while Stock B was use in Examples 9 to 12. Both stocks were run with no urea (control), 0.5 part and 1.0 part of the urea.

Table I

|  | Stock A (parts) | Stock B (parts) |
| --- | --- | --- |
| SBR 1712 | — | 137.5 |
| Smoked sheets | 100 | — |
| Carbon black | 50 | 68 |
| Stearic acid | 3 | 1.5 |
| Wax | 3 | — |
| Zinc oxide | 3 | 5 |
| Amine antioxidant | 1 | — |
| Sulfur | 2.5 | 1.5 |
| 2-(morpholinodithio)-benzothiazole | 0.5 | 1 |
| Urea | 0–0.5–1.0 | 0–0.5–1.0 |

The results obtained using Stock A are listed in Table III and the results using Stock B in Table IV. The rheometer data was obtained at a temperature of 275° F. in natural rubber and 302° F. in SBR. The Mooney Scorch data was determined at 250° F. in natural rubber and 270° F. in SBR.

The effect of the ureas was measured by comparison with the control, i.e., the stock with no urea present. Ratios of the measurements for the urea compounded stocks over the measurements for the control stock are listed in the tables. The $c$ subscript indicates that the measurement was made on the control stock. Values of $\Delta Rh/\Delta Rh_c$ which are over 1.00 indicate that the urea has increased the state of vulcanization. Values of $(t_{90} - t_4)/(t_{90} - t_4)_c$ which are less than 1.0, indicate an activating effect of the urea on the vulcanization rate. Values of $t\Delta 5/t\Delta 5_c$ which are over 1.0 indicate that the urea has increased the scorch delay time, i.e., increased scorch resistance.

Table II contains a list of the various ureas evaluated.

Table II

| | (urea) |
| --- | --- |
| A | 1,3-Bis(morpholinothio)-2-imidazolidinone |
| B | 1,3-Bis(piperidinothio)-2-imidazolidinone |
| C | 1,3-Bis(morpholinothio)-2-benzimidazolidone |
| D | 1,3-Bis(morpholinothio)-5,5-dimethylhydantoin |

Table III (natural rubber)

| | | $\Delta Rh/\Delta Rh_c$ | | $\dfrac{(t_{90}-T_4)}{(t_{90}-t_4)_c}$ | | $t\Delta 5/t\Delta 5_c$ | |
| --- | --- | --- | --- | --- | --- | --- | --- |
| | | (parts) | | (parts) | | (parts) | |
| Exp. | Urea | 0.5 | 1.0 | 0.5 | 1.0 | 0.5 | 1.0 |
| 5 | A | 1.24 | 1.31 | 0.82 | 0.89 | 1.23 | 1.29 |
| 6 | B | 1.29 | 1.41 | 0.85 | 0.84 | 0.93 | 1.32 |
| 7 | C | 1.21 | 1.28 | 0.89 | 0.95 | 1.46 | 1.6 |
| 8 | D | 1.23 | 1.25 | 0.76 | 0.89 | 1.28 | 1.47 |

Table IV (SBR)

| | | $\Delta Rh/\Delta Rh_c$ | | $\dfrac{(t_{90}-t_4)}{(t_{90}-t_4)_c}$ | | $t\Delta 5/t\Delta 5_c$ | |
| --- | --- | --- | --- | --- | --- | --- | --- |
| | | (parts) | | (parts) | | (parts) | |
| Exp. | Urea | 0.5 | 1.0 | 0.5 | 1.0 | 0.5 | 1.0 |
| 9 | A | 1.18 | 1.31 | 0.59 | 0.50 | 1.02 | 1.08 |
| 10 | B | 1.23 | 1.41 | 0.47 | 0.45 | 0.93 | 1.13 |
| 11 | C | 1.13 | 1.21 | 0.71 | 0.63 | 1.24 | 1.43 |
| 12 | D | 1.06 | 1.15 | 0.78 | 0.69 | 1.06 | 1.08 |

In Table III all of the compounds exhibited sulfur donor properties and were activators. Only one was not a retarder at the 0.5 part level. And at the 1.0 part level, it was a retarder just as the other compounds were.

In Table IV, all of the compounds exhibited sulfur donor properties and were activators. One of the compounds did not function as a retarder at the 0.5 part level, but did so at the 1.0 part level.

The urea, 1,3-bis(morpholinothio)-imidazolidinone (1.0 part) was used in a carbon black loaded natural rubber (smoked sheet) composition with 2.5 parts of sulfur and 1.0 part of 2-(morpholinodithio)-benzothiazole. In one instance diphenyl guanidine was used as the secondary accelerator and in another instance tetramethyl thiuram disulfide was used as the activator. In each instance the state of vulcanization and scorch delay time was increased.

The same urea (0.5 part) was used in a carbon black loaded smoked sheet composition with 2.5 parts of sulfur in one instance with 0.5 part of benzothiazyl disulfide and in another instance with 0.5 part of 2-mercaptobenzothiazole. In each instance the state and rate of vulcanization and scorch delay time were increased.

The above examples are not intended to be limiting but rather illustrative. Any of the sulfur donors, accelerators and rubbers described earlier herein can be substituted in the preceding examples. In addition, the levels of the sulfur donors and other components in said examples could be altered in accordance with the general teachings herein.

The additives of this invention can be used at various concentrations as low as 0.25 part per 100 parts be weight of rubber and even as low as 0.10 or even 0.05 part. Conventional levels would frequently be 0.5 and 1.0 part, although levels as high as 1.5, 3.0, 5.0 and even 10 parts can be used. Most frequently the concentration ranges from 0.25 to 5.0 parts, more preferably from 0.25 to 3.0 parts and most preferably from 0.25 to 1.50 parts.

The sulfur donor compounds of the present invention are preferably added to the rubbery polymer at the same time that the accelerator is added, although this order of addition is not necessary to the successful utilization of the compounds of this invention.

The compounds of the present invention are effective in the presence of organic accelerators whether they are diarylguanidines such as diphenylguanidine, or thiazoles, more specifically benzothiazyl amino disulfides, such as 2-(morpholinodithio)-benzothiazole, or thiazoles (also sulfenamides), more specifically thiazolesulfenamides, and even more specifically benzothiazolesulfenamides such as 2-(morpholinothio)-benzothiazole and N-cyclohexyl-2-benzothiazolesulfenamide, i.e., regardless of what type of organic accelerator is used. Thiuram sulfides such as tetramethylthiuram monosulfide and disulfide and tetraethylthiuram monosulfide and disulfide may be used as well as other benzothiazolesulfenamides such as N-(t-butyl)-2-benzothiazolesulfenamide.

Various organic accelerators useful within the practice of this invention are described and illustrated in the *Vanderbilt Rubber Handbook*, 1968 Edition, R. T. Vanderbilt Company, Inc., particularly at pages 242 and 244 and also in the bulletin of the Elastomer Chemicals Dept. of the E. I. Du Pont de Nemours and Co. (inc.) entitled, "Accelerators, Vulcanizing Agents and Retarders, Brochure No. SD A54457."

The polymers in which the ureas of the present invention are incorporated remain suitable for their art recognized uses, e.g., in tires and industrial products.

1,3-Bis(piperidinothio)-hexahydro-2-pyrimidone, 1,3-bis(N-ethylanilinothio)-2-imidazolidinone and 1,3-bis(-di-n-butylaminothio)-2-imidazolidinone were tested in the natural rubber and SBR formulations of Tables III and IV at the 0.5 and 1.0 part levels. All offered at least a slight improvement in the state of vulcanization in both rubbers. All but 0.5 part of the ethylanilinothio compound in natural rubber improved the state of vulcanization. Only the butylaminothio compound offered any degree of retarding effect. Although a very strong activator in SBR, the pyrimidone was very scorchy.

Compounds referred to earlier herein as being retarders and/or activators in natural rubber and SBR are merely illustrative and not limiting.

The balanced processing and vulcanization characteristics are most often obtained when free sulfur (elemental sulfur) and a primary accelerator are used with the urea.

Sometimes compounds are both a sulfur donor (and therefore a sulfur vulcanizing agent) and an accelerator, e.g., 2-(morpholinodithio)-benzothiazole. Such compounds can be used with the ureas, with or without another sulfur vulcanizing agent and/or another accelerator.

The compounds of the present invention can be used effectively in any sulfur vulcanizable polymer and with any organic accelerating agent.

Wherever the term "β-cyanoethyl" appears earlier herein, the compound is an "N-β-cyanoethyl" compound. Likewise wherever "cyanomethyl" appears, the compound is an "N-cyanomethyl" compound.

When R is a saturated or olefinic divalent cyclic aliphatic radical, preferably it contains 5 to 7 carbon atoms. When R is an arylene radical, preferably it contains 6 to 10 carbon atoms.

While certain representative embodiments and details have been shown for the purpose of illustrating the invention, it will be apparent to those skilled in the art that various changes and modifications may be made therein without departing from the spirit or scope of the invention.

What is claimed is:

1. A sulfur vulcanizable rubber selected from the group consisting of natural rubber and synthetic homopolymers and copolymers of conjugated dienes having incorporated therein 0.25 to 10 parts by weight per 100 parts by weight of rubber of a urea having the following structural formula

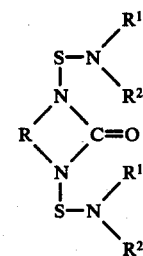

wherein R is selected from the group consisting of saturated or olefinic divalent aliphatic radicals having 1 to 7 carbon atoms, saturated or olefinic divalent cyclic aliphatic radicals having 5 to 7 carbon atoms, arylene radicals having 6 to 10 carbon atoms and the radical

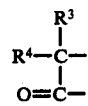

which together with the

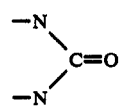

radical forms a hydantoin ring wherein $R^3$ and $R^4$ are selected from the group consisting of hydrogen, alkyl radicals having 1 to 4 carbon atoms, cycloalkyl radicals having 5 to 6 carbon atoms, aralkyl radicals having 7 to 10 carbon atoms and aryl radicals having 6 to 10 carbon atoms or $R^3$ and $R^4$ can be joined to form with the attached carbon atom a hydrocarbon ring containing 5 to 6 carbon atoms, and wherein $R^1$ and $R^2$ are selected from the group consisting of alkyl radicals having 1 to 20 carbon atoms, cyanoalkyl radicals having 2 to 21 carbon atoms, cycloalkyl radicals having 5 to 20 carbon atoms, aralkyl radicals having 7 to 20 carbon atoms and aryl radicals having 6 to 20 carbon atoms and wherein $R^1$ and $R^2$ can be joined through a member of the group consisting of $-CH_2-$, $-O-$ and $-S-$ to constitute with the attached nitrogen atom a heterocyclic ring.

2. The sulfur vulcanizable polymer according to claim 1 wherein the polymer has incorporated therein an organic accelerating agent.

3. The sulfur vulcanizable polymer according to claim 1 wherein the polymer has incorporated therein a sulfur vulcanizing agent.

4. The sulfur vulcanizable polymer according to claim 2 wherein the organic accelerating agent is a primary accelerator and the polymer has incorporated therein elemental sulfur.

5. The sulfur vulcanizable polymer according to claim 1 wherein the urea is present in the amount of from 0.25 part to 5.0 parts by weight per 100 parts by weight of polymer.

6. The sulfur vulcanizable polymer according to claim 1 wherein R is selected from the group consisting of ethylene, 1-oxo-2,2-dimethylethylene, 4,5-cyclohexenylene, ortho-phenylene and 1,3-propylene and

is selected from the group consisting of morpholino, 2,6-dimethylmorpholino, piperidino, diethylamino, diisopropylamino, 3-methylpiperidino, dicyclohexylamino, N-β-cyanoethylcyclohexylamino, N-β-cyanoethyl-t-butylamino, N-β-cyanoethyl-n-butylamino, N-phenylcyclohexylamino, N-methylanilino, N-ethylanilino, N-ethylbenzylamino, dibenzylamino, N-phenylbenzylamino, N-cyanomethylcyclohexylamino, and N-cyanomethyl-n-butylamino.

7. The sulfur vulcanizable polymer according to claim 1 wherein the urea is selected from the group consisting of 1,3-bis(morpholinothio)-2-imidazolidinone, 1,3-bis(morpholinothio)-2-benzimidazolinone and 1,3-bis(morpholinothio)-5,5-dimethylhydantoin.

8. The rubber composition of claim 1 wherein the rubber is selected from the group consisting of butyl rubber, ethylene-propylene terpolymers, copolymers of 1,3-butadiene and styrene, copolymers of 1,3-butadiene and acrylonitrile, and natural rubber.

9. The rubber composition of claim 7 wherein the rubber is selected from the group consisting of butyl rubber, ethylene-propylene terpolymers, copolymers of 1,3-butadiene and styrene, copolymers of 1,3-butadiene and acrylonitrile, and natural rubber.

* * * * *